US011061603B1

(12) United States Patent
Bankar et al.

(10) Patent No.: US 11,061,603 B1
(45) Date of Patent: Jul. 13, 2021

(54) SYSTEMS AND METHODS FOR SWITCHING REPLICATION MODES IN A VOLUME REPLICATION SYSTEM

(71) Applicant: Veritas Technologies LLC, Santa Clara, CA (US)

(72) Inventors: Pritam Bankar, Pune (IN); Sumit Dighe, Pune (IN); Shailesh Marathe, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 56 days.

(21) Appl. No.: 16/695,325

(22) Filed: Nov. 26, 2019

(51) Int. Cl.
*G06F 3/06* (2006.01)

(52) U.S. Cl.
CPC ............ *G06F 3/065* (2013.01); *G06F 3/0614* (2013.01); *G06F 3/0659* (2013.01); *G06F 3/0673* (2013.01); *G06F 2211/104* (2013.01)

(58) Field of Classification Search
CPC ...... G06F 3/065; G06F 3/0614; G06F 3/0659; G06F 3/0673; G06F 2211/104
See application file for complete search history.

(56) References Cited

U.S. PATENT DOCUMENTS 10,496,489 B1 * 12/2019 Chen ........................ G06F 3/065
2010/0138625 A1 * 6/2010 Noguchi ................... G06F 8/65
711/167
2020/0326866 A1 * 10/2020 Catalano ............. G06F 11/3419

* cited by examiner

*Primary Examiner* — Eric Cardwell
(74) *Attorney, Agent, or Firm* — FisherBroyles, LLP

(57) ABSTRACT

The disclosed computer-implemented method for switching replication modes in a volume replication system may include (i) in response to deciding to switch from a synchronous replication mode of a volume replication system to an asynchronous replication mode, changing, by a computing device, to the asynchronous replication mode, (ii) associating a new write request to write data to storage, (iii) determining, based on metadata of the existing write request, that the existing write request was issued in the synchronous replication mode, (iv) in response to determining that the existing write request was issued in the synchronous replication mode, processing the existing write request via the synchronous replication, and (v) processing the new write request via the asynchronous replication based on the metadata of the new write request. Various other methods, systems, and computer-readable media are also disclosed.

20 Claims, 9 Drawing Sheets

500

Start

Decide to switch to asynchronous replication mode from synchronous replication mode
502

Change replication mode to asynchronous replication mode
504

Associate new write requests with metadata indicating new write request was issued during asynchronous replication mode
506

Determine that the existing write request was issued during synchronous replication mode
508

Process existing write request via synchronous replication mode
510

Process new write request via asynchronous replication mode
512

End

SYSTEMS AND METHODS FOR SWITCHING REPLICATION MODES IN A VOLUME REPLICATION SYSTEM

BACKGROUND

A volume replication system is a data-replication system that provides disaster recovery tools by maintaining an exact or consistent copy of application data at one or more remote storage locations. In the event of a disaster to the primary storage location, the data replicated to the remote storage locations may be used to restore the system. Volume replication systems typically support two basic modes for replication—synchronous and asynchronous replication modes. The synchronous replication mode may require that a write request from an application is persisted on a primary site and also received by a secondary storage device before acknowledging the write as complete to the originating application. The asynchronous replication mode may acknowledge the write request as complete to the originating application after the data is persisted on the primary site.

In conventional volume replication systems, if a change of replication mode is needed (e.g., from synchronous replication mode to asynchronous replication mode, or vice versa), pending write requests of the current replication mode may need to be drained or completed before changing to a different replication mode. The pending write requests may need to be drained in order to update information regarding the current mode of replication in memory as well as on disk. Unfortunately, draining the pending write requests before changing replication modes in a volume replication system may cause a lag or glitch to application throughput. Additionally, network latency sensitive applications may crash if draining the pending write requests takes too much time, resulting in possible data loss or other negative results. The instant disclosure, therefore, identifies and addresses a need for systems and methods for switching replication modes in a volume replication system.

SUMMARY

As will be described in greater detail below, the instant disclosure describes various systems and methods for switching replication modes in a volume replication system.

In one example, a method for switching replication modes in a volume replication system may include (i) in response to deciding to switch from a synchronous replication mode of a volume replication system to an asynchronous replication mode, changing, by a computing device, to the asynchronous replication mode, (ii) associating a new write request to write data to storage with metadata indicating that the new write request was issued while the volume replication system was in the asynchronous replication mode, (iii) determining, based on metadata of the existing write request, that the existing write request was issued while the volume replication system was in the synchronous replication mode, (iv) in response to determining that the existing write request was issued in the synchronous replication mode, processing the existing write request via synchronous replication, and (v) processing the new write request via asynchronous replication based on the metadata of the new write request.

In some examples, processing the existing write request via the synchronous replication may include (i) receiving the existing write request from an application of the computing device, (ii) logging the existing write request to a storage log of the computing device, (iii) processing the existing write request by writing data to a data volume of the computing device, (iv) transmitting the existing write request to a secondary storage device, (v) logging the existing write request to a secondary storage replicator log of the secondary storage device, (vi) processing the existing write request by writing data to a secondary data volume of the secondary storage device, and (vii) in response to processing the existing write request at the secondary storage device, notifying the application that the existing write request is complete.

In some examples, processing the new write request via the asynchronous replication may include (i) receiving the new write request from an application of the computing device, (ii) logging the new write request to a storage replicator log of the computing device, (iii) processing the new write request by writing data to a data volume of the computing device, (iv) in response to processing the new write request at the computing device, notifying the application that the new write request is complete, (v) transmitting the new write request to a secondary storage device at a later point in time, (vi) logging the new write request to a secondary storage replicator log of the secondary storage device, and (vii) processing the new write request to write data to a secondary data volume of the secondary storage device.

In one example, the method may include (i) in response to deciding to switch from the asynchronous replication mode to the synchronous replication mode, associating a different new write request with metadata indicating that the different new write request was issued while in the synchronous replication mode and associating the different new write request with a new generation number, (ii) processing a different existing write request via the asynchronous replication based on metadata indicating that the different existing write request was issued while in the asynchronous replication mode and an old generation number of the different existing write request indicating the different existing write request was generated while in the asynchronous replication mode, (iii) processing the different new write request via the synchronous replication based on the metadata of the different new write request and the new generation number of the different new write request, and (iv) in response to determining that each existing write request has been processed, changing to the synchronous replication mode.

The method may further include, in response to deciding to switch from the asynchronous replication mode to the synchronous replication mode, generating the new generation number by incrementing the old generation number to indicate a switch in replication modes, generating a counter indicative of a total number of different existing write requests generated while in the asynchronous replication mode, decrementing the counter for each different existing write request that has been processed, and in response to the counter reaching a predetermined value indicating that each of the different existing write requests has been processed, changing to the synchronous replication mode.

In one example, the method may include deciding to switch from the synchronous replication mode of the volume replication system to the asynchronous replication mode based on a threshold of a computing environment of the computing device by determining that the threshold has been exceeded and in response to determining that the threshold has been exceeded, deciding to change to the asynchronous replication mode. In some examples, the threshold may be based on at least one of a network latency, an application load processing time, an application throughput limit, an input/output operations per second limit, an application workload pattern, or a window of time.

In one example, a system for switching replication modes in a volume replication system may include a computing device comprising at least one physical processor and physical memory comprising computer-executable instructions. Executing the computer-executable instructions may cause the computing device to (i) in response to deciding to switch from a synchronous replication mode of a volume replication system to an asynchronous replication mode, change to the asynchronous replication mode, (ii) associate a new write request to write data to storage with metadata indicating that the new write request was issued while the volume replication system was in the asynchronous replication mode, (iii) determine, based on metadata of the existing write request, that the existing write request was issued while the volume replication system was in the synchronous replication mode, (iv) in response to determining that the existing write request was issued in the synchronous replication mode, process the existing write request via the synchronous replication, and (v) process the new write request via the asynchronous replication based on the metadata of the new write request.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) in response to deciding to switch from a synchronous replication mode of a volume replication system to an asynchronous replication mode, change to the asynchronous replication mode, (ii) associate a new write request to write data to storage with metadata indicating that the new write request was issued while the volume replication system was in the asynchronous replication mode, (iii) determine, based on metadata of the existing write request, that the existing write request was issued while the volume replication system was in the synchronous replication mode, (iv) in response to determining that the existing write request was issued in the synchronous replication mode, process the existing write request via the synchronous replication, and (v) process the new write request via the asynchronous replication based on the metadata of the new write request.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
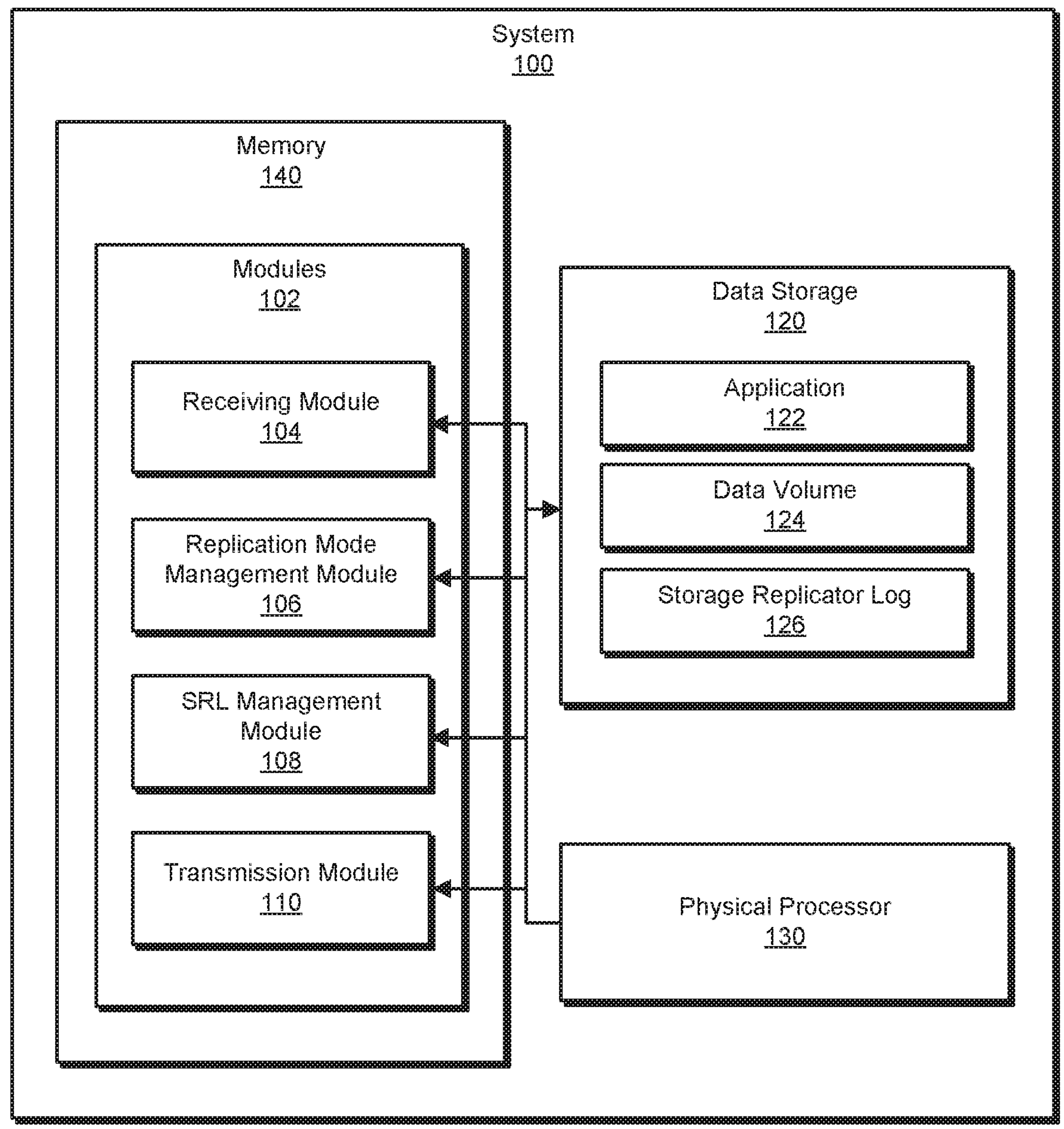
FIG. 1 is a block diagram of an example system for switching replication modes in a volume replication system.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for switching replication modes in a volume replication system. The systems and methods described herein are directed to providing sustained application throughput despite fluctuating network or application processing latency. In a volume replication system, a consistent copy of application data may be maintained at one or more remote locations. The data may be replicated to the remote locations through synchronous or asynchronous replication. In some examples, the synchronous replication mode may enable a write request from an application to be posted to both primary and secondary storage locations before the write completes at the application level. When replicating in the synchronous replication mode, the data on the secondary storage device may be completely up-to-date and, if a disaster occurs at the primary storage site, data may be recovered from any surviving secondary storage device without any loss.

The asynchronous replication mode may be useful when it is acceptable for the secondary storage location to not be up-to-date. When replicating in the asynchronous replication mode, an update to the primary storage location may be complete when it has been recorded in the storage replicator log (SRL) of the primary storage site. The asynchronous replication mode may not guarantee that the data is current at all times but may have less of an impact on application performance and may provide the ability to use more cost-effective telecommunications. All completed updates to the primary storage location may be guaranteed to be made on the secondary storage location with some delay.

In some examples, the synchronous replication mode of the volume replication system may provide the most current data on secondary storage site but may negatively impact application performance in high latency or limited bandwidth environments. The response time experienced by the application may be affected because the write request has to wait for the secondary storage site to acknowledge it before the write request can be marked as complete on the primary storage site. The systems and methods described herein are directed to switching replication modes depending on the current conditions of the computing environment. For example, in response to determining an increase in network latency, the system may determine to switch the volume replication system from a synchronous replication mode to an asynchronous replication mode to sustain or maintain a specified level of application throughput. Similarly, in response to determining that the network latency has decreased to an acceptable level, the system may switch the volume replication system from asynchronous replication mode to synchronous replication mode.

To use the secondary storage site in a disaster recovery scenario, write-order fidelity of write requests applied to data volumes may need to be maintained. Write-order fidelity may include the volume replication system tracking write requests on the primary storage location in the order in which they are received and applying them on the secondary storage location in the same order. It may be important to maintain write-order fidelity to ensure that the data on the secondary storage location is consistent with the data on the primary storage location. While the data at the secondary storage location may be behind in time, it may be a consistent image of the primary storage location at a point in the past. Without write-order fidelity, there may not be a guarantee that a secondary storage location has consistent, recoverable data. The volume replication system may maintain write-order fidelity regardless of the mode of replication and across all the data volumes in the system. In some embodiments, the volume replication system may maintain write-order fidelity across all the data volumes during the switching of replication modes by the system.

Figure 2:
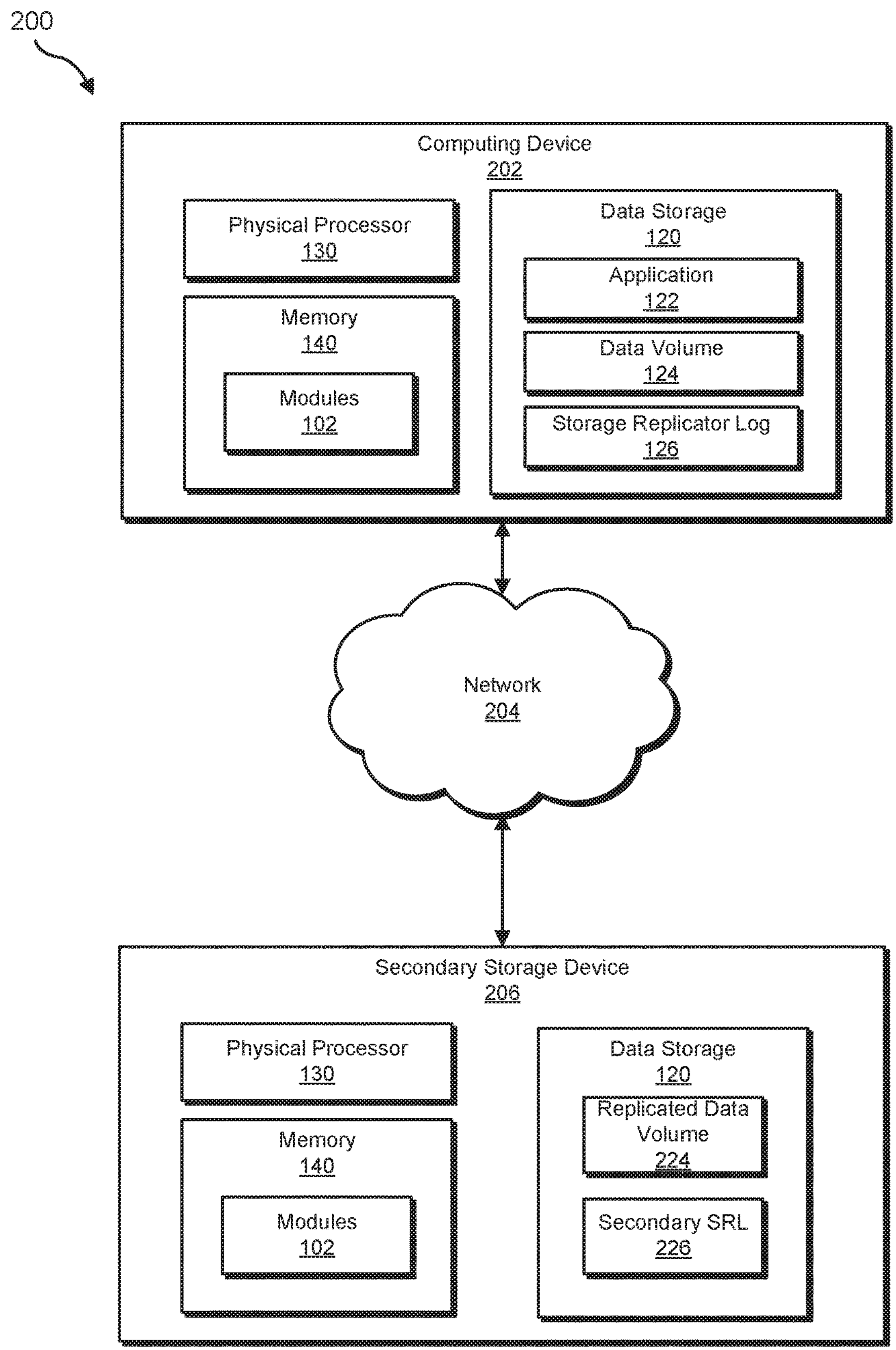
FIG. 2 is a block diagram of an additional example system for switching replication modes in a volume replication system.

The following will provide, with reference to FIGS. 1-2, detailed descriptions of example systems for switching replication modes in a volume replication system. Detailed descriptions of corresponding computer-implemented methods will also be provided in connection with FIGS. 3-6. A detailed description of data flow through the example system for switching replication modes in a volume replication system will also be provided in connection with FIG. 7. In addition, detailed descriptions of an example computing system and network architecture capable of implementing one or more of the embodiments described herein will be provided in connection with FIGS. 8-9, respectively.

FIG. 1 is a block diagram of an example system 100 for switching replication modes in a volume replication system. As illustrated in this figure, the example system 100 may include one or more modules 102 for performing one or more tasks. As will be explained in greater detail below, the modules 102 may include a receiving module 104, a replication mode management module 106, a storage replicator log (SRL) management module 108, and a transmission module 110. Although illustrated as separate elements, one or more of the modules 102 in FIG. 1 may represent portions of a single module or application.

In certain embodiments, one or more of the modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., the computing device 202 and/or the secondary storage device 206). One or more of the modules 102 in FIG. 1 may also represent all or portions of one or more special-purpose computers configured to perform one or more tasks.

As illustrated in FIG. 1, the example system 100 may also include one or more memory devices, such as the memory 140. The memory 140 generally represents any type or form of volatile or non-volatile storage device or medium capable of storing data and/or computer-readable instructions. In one example, the memory 140 may store, load, and/or maintain one or more of the modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, the example system 100 may also include one or more physical processors, such as the physical processor 130. The physical processor 130 generally represents any type or form of hardware-implemented processing unit capable of interpreting and/or executing computer-readable instructions. In one example, the physical processor 130 may access and/or modify one or more of the modules 102 stored in memory 140. Additionally, or alternatively, the physical processor 130 may execute one or more of the modules 102 to facilitate switching replication modes in a volume replication system. Examples of the physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, the example system 100 may also include the data storage 120. The data storage 120 generally represents any type or form of computing device capable of data storage. In one example, the data storage 120 may store an application 122, data volume 124, and/or a storage replicator log (SRL) 126.

The example system 100 in FIG. 1 may be implemented in a variety of ways. For example, all or a portion of the example system 100 may represent portions of the example system 200 in FIG. 2. As shown in FIG. 2, the system 200 may include a computing device 202 in communication with a secondary storage device 206 via a network 204. In one example, all or a portion of the functionality of the modules 102 may be performed by the computing device 202, secondary storage device 206, and/or any other suitable computing system. As will be described in greater detail below, one or more of the modules 102 from FIG. 1 may, when executed by at least one processor of the computing device 202 and/or the secondary storage device 206, enable the computing device 202 and/or the secondary storage device 206 for replicating data in a volume replication system.

The computing device 202 generally represents any type or form of computing device capable of reading computer-executable instructions. For example, the computing device 202 may include an endpoint device (e.g., a mobile computing device) running data storage software. Additional examples of the computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The secondary storage device 206 generally represents any type or form of computing device that is capable of reading computer-executable instructions and data storage. In one example, the secondary storage device 206 may include an endpoint (e.g., a server) running data storage software. Additional examples of the secondary storage device 206 include, without limitation, security servers, application servers, web servers, storage servers, and/or database servers configured to run certain software applications and/or provide various security, web, storage, and/or database services. Although illustrated as a single entity in FIG. 2, the secondary storage device 206 may include and/or represent a plurality of servers that work and/or operate in conjunction with one another.

The network 204 generally represents any medium or architecture capable of facilitating communication or data transfer. In one example, the network 204 may facilitate communication between the computing device 202 and the secondary storage device 206. In this example, the network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to the system 100 in FIG. 1 and/or the system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. The systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
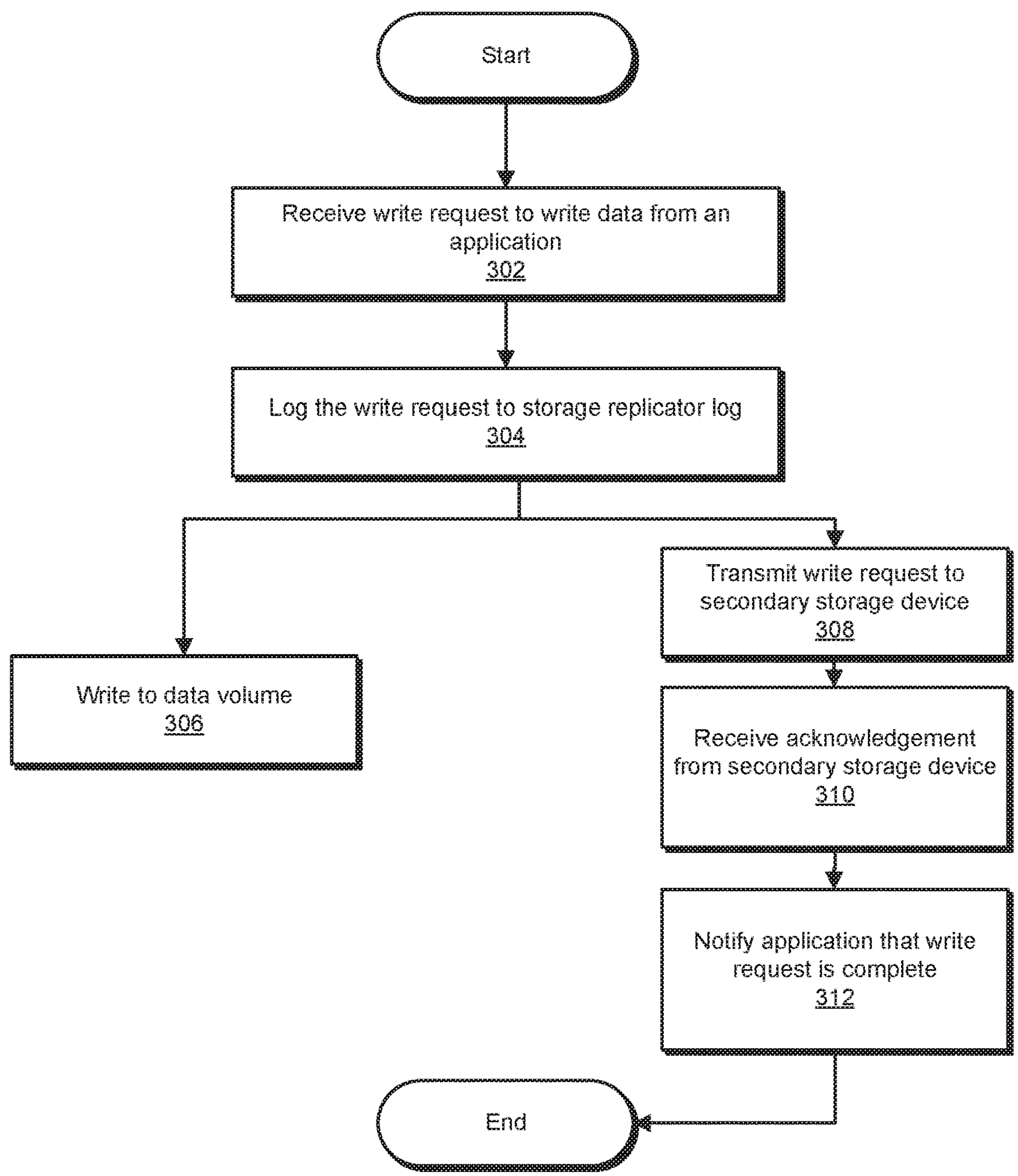
FIG. 3 is a flow diagram of an example method for switching replication modes in a volume replication system.

FIG. 3 is a flow diagram of an example computer-implemented method 300 for synchronous volume replication in a volume replication system. The steps shown in FIG. 3 may be performed by any suitable computer-executable code and/or computing system, including the system 100 in FIG. 1, the system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive a write request from an application of a computing device. The systems described herein may perform step 302 in any suitable manner. For example, the receiving module 104 may, as part of computing device 202 in FIG. 2, receive a write request from an application, such as application 122, of the computing device 202 to write data to a data volume, such as data volume 124.

The term "write request," as used herein, generally refers to a request from an application to perform a write operation of data from the application to a location in a data volume. The write request may include the data to be stored, an identification of a location where the data is to be stored, and additional information, such as identification of the issuing application, type of data to be stored, date and time of the write request, and the like. The application issuing the write request may be any type of application that obtains, analyzes, and/or generates data. The application may execute locally and/or remotely (e.g., executing on the computer system implementing the method or on a different computer system). The write request may be received from within the computer system implementing the method, or externally, e.g., through a network. In response to receiving a write request from the application, a write operation may be performed to fulfill the write request.

In some examples, the receiving module 104 may receive the write request from the application 122. The receiving module 104 may transmit the write request to the replication mode management module 106, which may analyze the write request and associated metadata. For example, the write request may include the data to be written to a location, identification of the location to which the data is to be written, and the like. The metadata associated with the write request may indicate the replication mode of the volume replication system when the write request was issued by the application 122, such as the synchronous replication mode or the asynchronous replication mode.

In some examples, the synchronous replication of the synchronous replication mode may include transmitting a write request issued by the application 122 to each associated remote link operating in the synchronous replication mode (e.g., each affiliated secondary storage site or system) and waiting for an acknowledgement that the request was received. In response to receiving acknowledgements for all replication or secondary storage sites operating in the synchronous replication mode, the replication mode management module 106 may notify the application 122 that issued the write request that the write request has been completed. In some examples, the acknowledgement received from the replication or secondary storage sites may not indicate that the write request has been committed to the secondary data volume (e.g. replicated data volume 224), but rather that it is available in memory on the replication or secondary system, and thus will be committed to the replicated data volume 224 barring a system failure.

At step 304, one or more of the systems described herein may log the write request to a storage replicator log. The systems described herein may perform step 304 in any suitable manner. For example, the SRL management module 108 may, as part of the system 200 in FIG. 2, log the write request from the application 122 to the storage replicator log (SRL) 126 of the computing device 202.

The term "storage replicator log" or "SRL" as used herein, generally refers to a log that tracks write requests of the computing device 202. Modules, such as the SRL management module 108, may log or write to the SRL associated with a data volume of the volume replication system. The SRL 126 may be used in data recovery to ensure that data is properly recovered after a disaster. The SRL 126 may include information about each write request of the computing device, data to be written, location of the data, issuing application of the write request, replication mode during which the write request was issued, and the like. The SRL 126 may provide write-order fidelity of issued write requests, ensuring that the order of write requests received from one or more applications is maintained and properly logged and recorded. The system may ensure write-order fidelity by tracking write requests in the SRL 126 of the computing device 202 in the order in which they are received and applying them on the secondary storage location (e.g., secondary storage device 206) in the same order. It may be important to maintain the write-order fidelity of the write requests through SRL 126 and secondary SRL 226 to ensure that the data on the secondary storage location (e.g., secondary storage device 206) is consistent with the data on the primary storage location (e.g., computing device 202). While the data at the secondary storage location may be behind in time, it must be a consistent image of the primary storage location at a point in the past. Without write-order fidelity, there may not be a guarantee that a secondary storage location has consistent, recoverable data. The primary storage location (e.g., the computing device 202), and the secondary storage device 206 may each maintain a separate SRL (e.g., SRL 126 and secondary SRL 226). The SRLs 126, 226 of the different sites and/or devices may be independent of each other and record the write-order fidelity of data received at each of the independent sites and/or devices.

In some examples, the SRL management module 108 may log the received write request to the SRL 126. The SRL management module 108 may log additional data, such as the metadata associated with the write request, which may include timestamps, identification of the replication module during which the write request was written, status of the write request (e.g., complete, pending, etc.), or the like. The SRL management module 108 may then notify the replication mode management module 106 that the write request has been logged to the SRL 126.

In some examples, each write request may be associated with a sequence number and/or a log position when it is written to the SRL. Secondary logging may be used at the secondary storage device (e.g., secondary SRL 226) so that even if a write request issued during the synchronous replication mode reaches the secondary storage device 206 ahead of a write request issued during the asynchronous replication mode, they will be applied to same log position as on primary SRL 126. Writes requests to the replicated data volume 224 may be applied in-order from secondary SRL 226.

At step 306, one or more of the systems described herein may write to the data volume in response to the write request. The systems described herein may perform step 306 in any suitable manner. For example, the replication mode management module 106, may write to the data volume 124 identified in the write request. In some examples, the replication mode management module 106 may obtain data to be written to the data volume 124 from the write request. The replication mode management module 106 may identify the location to which the data is to be written (e.g., data volume 124). The replication mode management module 106 may then write the data to the identified location of the computing device 202.

At step 308, one or more of the systems described herein may transmit the write request to a secondary storage device. The systems described herein may perform step 308 in any suitable manner. For example, the replication mode management module 106 may, in response to logging the write request to the SRL 126, cause the transmission module 110 to transmit the write request to a secondary storage device, such as the secondary storage device 206. In some examples, this step may be performed simultaneously or nearly simultaneously as step 306. The transmission module 110 may identify one or more devices that are currently operating in the synchronous replication mode. For example, a user or administrator of the system may specify one or more storage devices on which the data of the computing device 202 should be replicated. The transmission module 110 may identify each storage device, such as the secondary storage device 206, which may be used to maintain a replicate of the data of the computing device 202 in a replicated data volume 224. The transmission module 110 may transmit the write request to each identified secondary storage device.

At step 310, one or more of the systems described herein may receive an acknowledgement from the secondary storage device. The systems described herein may perform step 310 in any suitable manner. For example, the transmission module 110 may receive the data acknowledgement from the secondary storage device 206 and transmit the acknowledgement to the replication mode management module 106. In the case that there are multiple secondary storage devices, the transmission module 110 may transmit the acknowledgments as they are received or may hold the acknowledgements until they have all been received from the multiple storage devices and transmit all of the acknowledgments to the replication mode management module 106 at the same time. In some examples, the data acknowledgement received from the secondary storage device may not indicate that the write request has been committed to the replicated data volume 224. Rather, the data acknowledgment may indicate that the write request is available in memory on the secondary system (e.g., secondary storage device 206) and/or has been logged to the secondary SRL 226 and will be committed to the replicated data volume 224 at a later time, barring a system failure. In response to receiving data acknowledgements from all the identified secondary storage devices, the SRL management module 108 may update the SRL 126 to indicate that the write request has been completed (e.g., a write operation has been performed on all the secondary storage sites to replicate the data from the write request).

At step 312, one or more of the systems described herein may notify that the write request has been completed. The systems described herein may perform step 312 in any suitable manner. The replication mode management module 106 may generate and transmit a notification to the application 122 that issued the write request. The notification may indicate that the write request has been completed (e.g., a write operation has been performed in response to the write request) and that data has been transmitted for storage to both the primary storage site (e.g., computing device 202) and the secondary storage site (e.g., secondary storage device 206).

Figure 4:
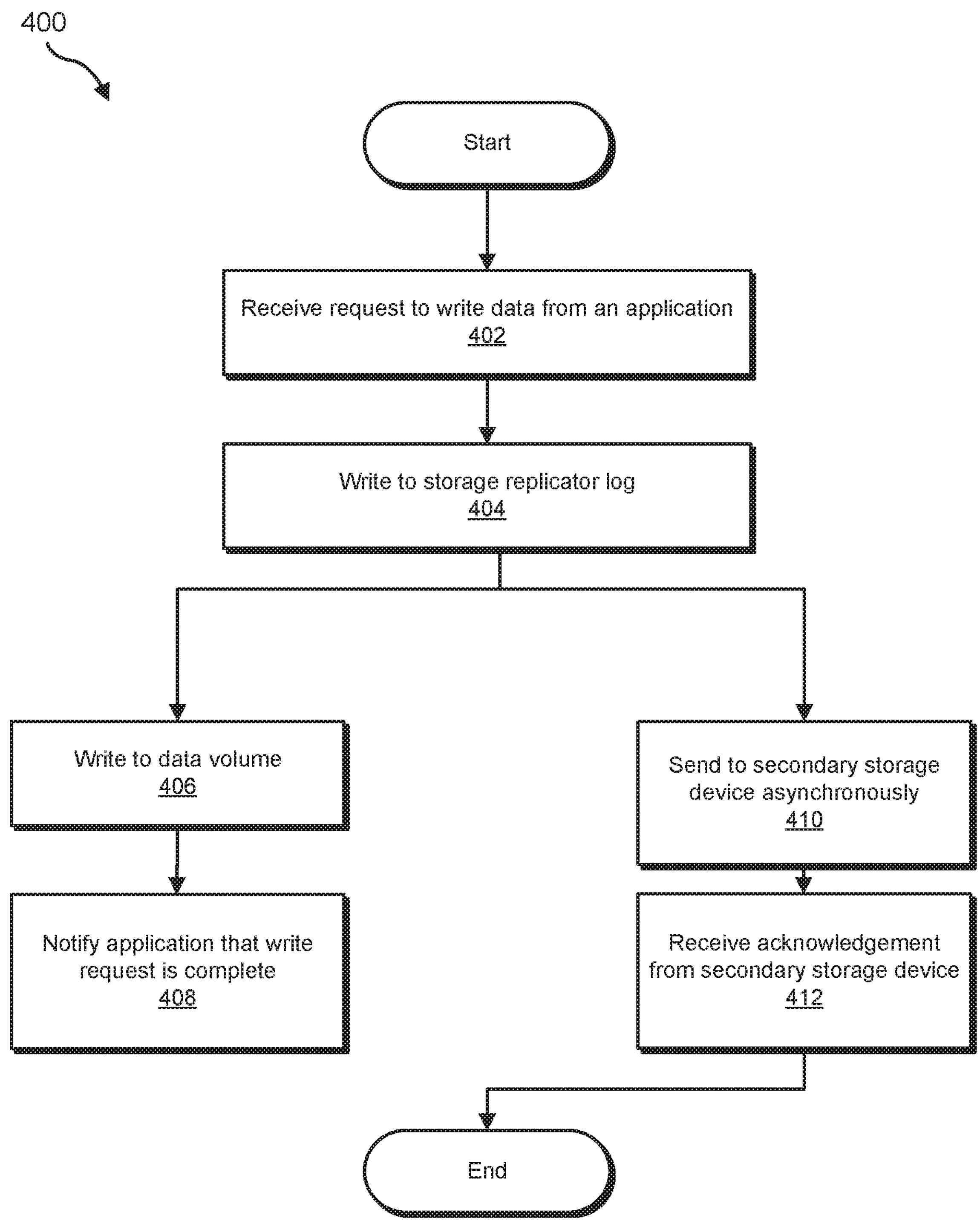
FIG. 4 is a flow diagram of another example method for switching replication modes in a volume replication system.

FIG. 4 is a flow diagram of another example computer-implemented method 400 for asynchronous volume replication in a volume replication system. The steps shown in FIG. 4 may be performed by any suitable computer-executable code and/or computing system, including the system 100 in FIG. 1, the system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may receive a data write request from an application of a computing device. The systems described herein may perform step 402 in any suitable manner. For example, the receiving module 104 may, as part of computing device 202 in FIG. 2, receive a write request from an application, such as application 122, of the computing device 202.

In some examples, the receiving module 104 may receive the write request from the application 122. The receiving module 104 may transmit the write request to the replication mode management module 106, which may analyze the write request and associated metadata. The metadata associated with the write request may indicate the replication mode of the volume replication system when the write request was issued by the application 122, such as the synchronous replication mode or the asynchronous replication mode.

In some examples, the asynchronous replication of the asynchronous replication mode may include logging the write request and performing a write operation to the data volume 124 of the computing device 202 and asynchronously transmitting the write request issued by the application 122 to each remote link (e.g., each affiliated secondary storage site or system).

At step 404, one or more of the systems described herein may log the write request to the SRL of the computing device. The systems described herein may perform step 404 in any suitable manner. For example, the SRL management module 108 may, as part of the system 200 in FIG. 2, log the write request from the application 122 to the SRL 126 of the computing device 202. In some examples, the SRL management module 108 may log the received write request to the SRL 126. The SRL management module 108 may log additional data, such as the metadata associated with the write request, which may include timestamps, identification of the replication module during which the write request was written, status of the write request (e.g., complete, pending, etc.), or the like. The SRL management module 108 may then notify the replication mode management module 106 that the write request has been logged to the SRL 126.

At step 406, one or more of the systems described herein may write to the data volume in response to the write request. The systems described herein may perform step 406 in any suitable manner. For example, the replication mode management module 106, may write to the data volume 124 identified in the write request issued by the application 122. In some examples, the replication mode management module 106 may obtain data to be written to the data volume 124 from the write request. The replication mode management module 106 may identify the location to which the data is to be written (e.g., data volume 124). The replication mode management module 106 may then write the data to the identified location of the computing device 202.

At step 408, one or more of the systems described herein may notify the application that issued the write request that the write request has been completed. The systems described herein may perform step 408 in any suitable manner. The replication mode management module 106 may generate and transmit a notification to the application 122 that the write request has been completed. In some examples, the notification may indicate that the write request has been logged to the SRL 126 and that the write operation will be performed at a later time to write the data of the write request to the data volume 124, barring a system failure.

At step 410, one or more of the systems described herein may transmit the write request to a secondary storage device. The systems described herein may perform step 410 in any suitable manner. For example, the replication mode management module 106 may, in response to logging the write request to the SRL 126, cause the transmission module 110 to transmit the write request to a secondary storage device, such as the secondary storage device 206. In some examples, this step may be performed simultaneously or nearly simultaneously as step 406. The transmission module 110 may identify one or more devices that are identified as secondary storage sites (e.g., secondary storage device 206). For example, a user or administrator of the system may specify one or more storage devices on which the data of the computing device 202 should be replicated. The transmission module 110 may identify each storage device, such as the secondary storage device 206, which may be used to maintain a replicate of the data of the computing device 202 in a replicated data volume 224. The transmission module 110 may transmit the write request to each identified secondary storage device.

At step 412, one or more of the systems described herein may receive an acknowledgement from the secondary storage device. The systems described herein may perform step 412 in any suitable manner. For example, the transmission module 110 may receive the acknowledgement from the secondary storage device 206 and transmit the acknowledgement to the replication mode management module 106. In the case that there are multiple secondary storage devices, the transmission module 110 may transmit the acknowledgments as they are received or may hold the acknowledgements until they have all been received from the multiple storage devices and transmit them at once to the replication mode management module 106. In some examples, the acknowledgement received from the secondary storage device may be a network acknowledgement indicating that the write request that been received at the secondary storage site. In some examples, the secondary storage site may also transmit a data acknowledgement. The data acknowledgement may not indicate that the write request has been committed to the replicated data volume 224. Rather, the data acknowledgment may indicate that the write request is available in memory on the secondary system (e.g., secondary storage device 206) and/or has been logged to the secondary SRL 226 and will be committed to the replicated data volume 224 at a later time, barring a system failure.

In response to receiving the acknowledgement, the replication mode management module 106 may cause the SRL management module 108 to update the SRL 126 to indicate the write request has been completed (e.g., the data has been replicated at the secondary storage site).

Figure 5:
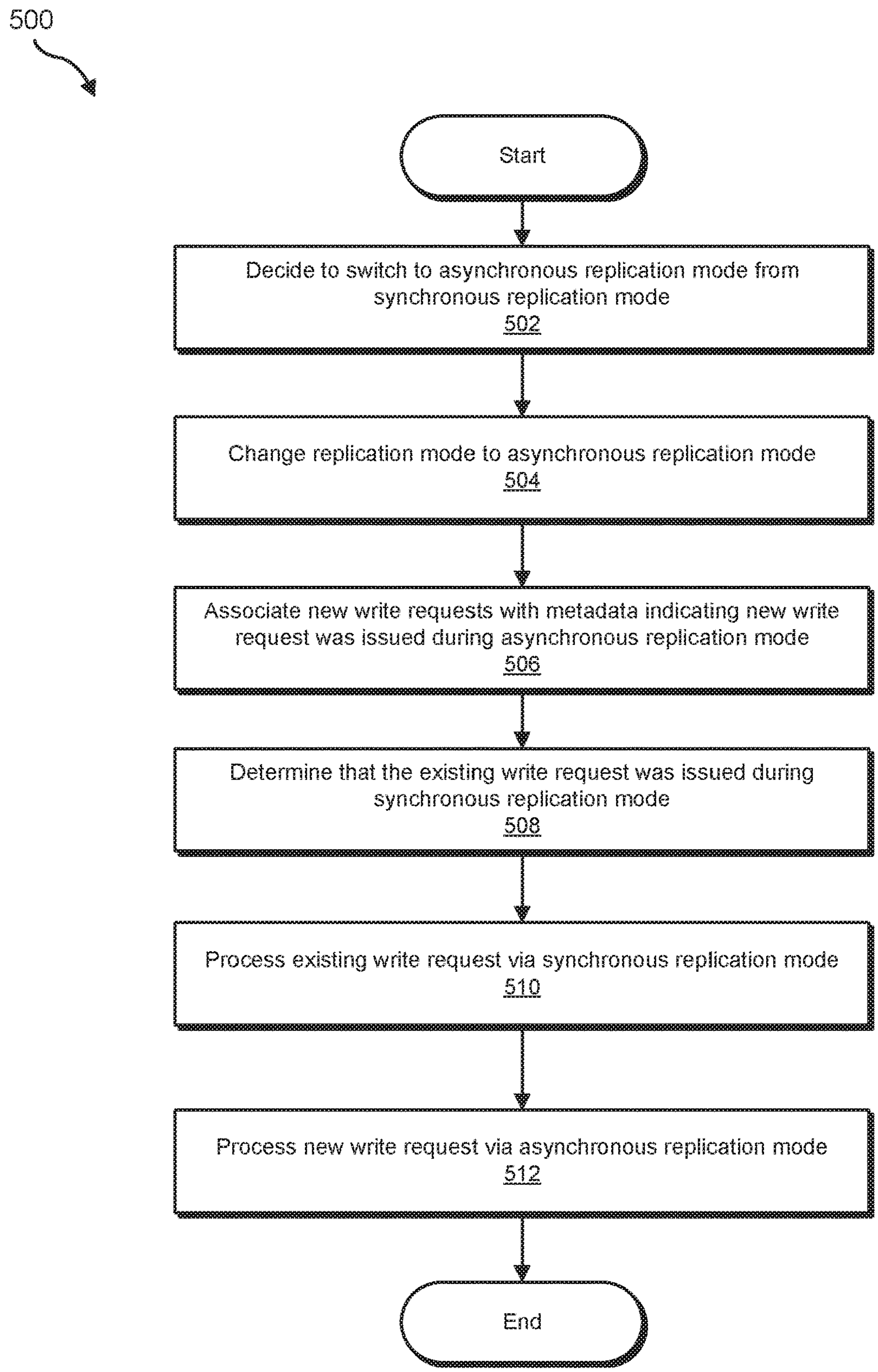
FIG. 5 is a block diagram of another example method for switching replication modes in a volume replication system.

FIG. 5 is a flow diagram of another example computer-implemented method 500 for switching replication modes in a volume replication system. The steps shown in FIG. 5 may be performed by any suitable computer-executable code and/or computing system, including the system 100 in FIG. 1, the system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 502 one or more of the systems described herein may decide to switch from a synchronous replication mode to an asynchronous replication mode in the volume replication system. The systems described herein may perform step 502 in any suitable manner. For example, the replication mode management module 106 may, as part of computing device 202 in FIG. 2, decide to switch from the synchronous replication mode to the asynchronous replication mode in the volume replication system. In some examples, the replication mode management module 106 may decide to switch replication modes in the volume replication system based on exceeding a threshold of a computing environment of the computing device 202.

The term "threshold," as used herein, generally refers to a configurable limit or threshold associated with a condition of the computing environment of the computing device 202. Examples of conditions that may be used to establish a threshold may include, but are not limited to, network latency, an application performance metric (e.g., application throughput or an input/output operations per second limit), an application workload pattern, and/or a window of time (e.g., specified days, times, etc.). In some examples, the threshold may be configured based on metrics specified, for example, in a service-level agreement. The threshold may be used to initiate switching replications modes in a volume replication system to adhere to metrics outlined in the service-level agreement.

In some examples, the threshold may be based on the network latency of the computing environment of the computing device 202. The network latency may indicate the total time it takes for data to reach a destination across the network and return (e.g., round trip delay). In some examples, applications, such as application 122, may be sensitive to network latencies (e.g., network latencies may contribute to a drop in the application throughput). In order to maintain an identified application throughput through an improvement in network latency, the replication mode management module 106 may decide to change from the synchronous replication mode to the asynchronous replication mode. In some examples, the replication mode management module 106 may continuously sample network latency or may receive metrics indicative of current network latency. The replication mode management module 106 may compare the current network latency to the threshold. In response to determining that the network latency has exceeded the threshold, the replication mode management module 106 may decide to switch from the synchronous replication mode to the asynchronous replication mode.

In some examples, the threshold may be based on an application performance metric, such as an application throughput value, input/output per seconds value, an application load processing time, or the like. The application load processing time may indicate the time for an application to complete processing a load of work. An increase in application load processing time may negatively impact the throughput of an application. By switching from the synchronous replication mode to the asynchronous application mode, the application load processing time may be improved to compensate for the increase in application load processing time. In some examples, the replication mode management module 106 may measure or obtain, a current application load processing time for the application 122. The replication mode management module 106 may compare the current application load processing time to the threshold to determine whether the current application load processing time has exceeded the threshold. In response to determining that the application load processing time has exceeded the threshold, the replication mode management module 106 may decide to change to the asynchronous replication mode from the synchronous mode.

At step 504, one or more of the systems described herein may change the replication mode of the volume replication system to the asynchronous mode. The systems described herein may perform step 504 in any suitable manner. For example, the replication mode management module 106 may update the system to indicate that the replication mode is now in the asynchronous replication mode. The replication mode management module 106 may initiate the change to the system to reflect the asynchronous replication mode, which may include updating information to indicate that new write requests are to be issued in or associated with the asynchronous mode, processing new write requests via asynchronous replication, and the like.

At step 506, one or more of the systems described herein may associate a new write request with metadata indicating the asynchronous replication mode. The systems described herein may perform step 506 in any suitable manner. For example, the replication mode management module 106 may use the updated information of the system to associate new write requests with metadata indicating that the write request should be processed via asynchronous replication. For example, the replication mode management module 106 may generate or change a flag in the metadata associated with the new write request to indicate that the new write request should be processed via asynchronous replication.

At step 508, one or more of the systems described herein may determine that the existing write request was issued during the synchronous replication mode. The systems described herein may perform step 508 in any suitable manner. For example, the replication mode management module 106 may analyze the metadata associated with the existing write request and determine that the existing write request was issued while the volume replication system was in the synchronous replication mode. For example, the replication mode management module 106 may identify a flag in the metadata associated with the existing write request and determine that the existing write request was issued while the system was in synchronous replication mode.

At step 510, one or more of the systems described herein may process an existing write request via synchronous replication. The systems described herein may perform step 510 in any suitable manner. In response to determining that the existing write request was issued during the synchronous replication mode, the replication mode management module 106 may initiate the processing of the existing write request via the synchronous replication, as described in relation to FIG. 3. Upon completion of the write request by the system in accordance to the steps outlined in FIG. 3, the replication mode management module 106 may notify the application 122 that the write request has been completed At step 512, one or more of the systems described herein may process the new write request via the asynchronous replication. The systems described herein may perform step 512 in any suitable manner. For example, the replication mode management module 106 may analyze the metadata associated with the new write request and determine that the new write request was issued while the volume replication system was in the asynchronous replication mode. For example, the replication mode management module 106 may identify a flag in the metadata and determine that the new write request was issued while the system was in asynchronous replication mode. The replication mode management module 106 may initiate processing the new write request via the asynchronous replication, as described in relation to FIG. 4. Upon completion of the write request by the system in accordance to the steps outlined in FIG. 4, the replication mode management module 106 may notify the application 122 that the write request has been completed.

Figure 6:
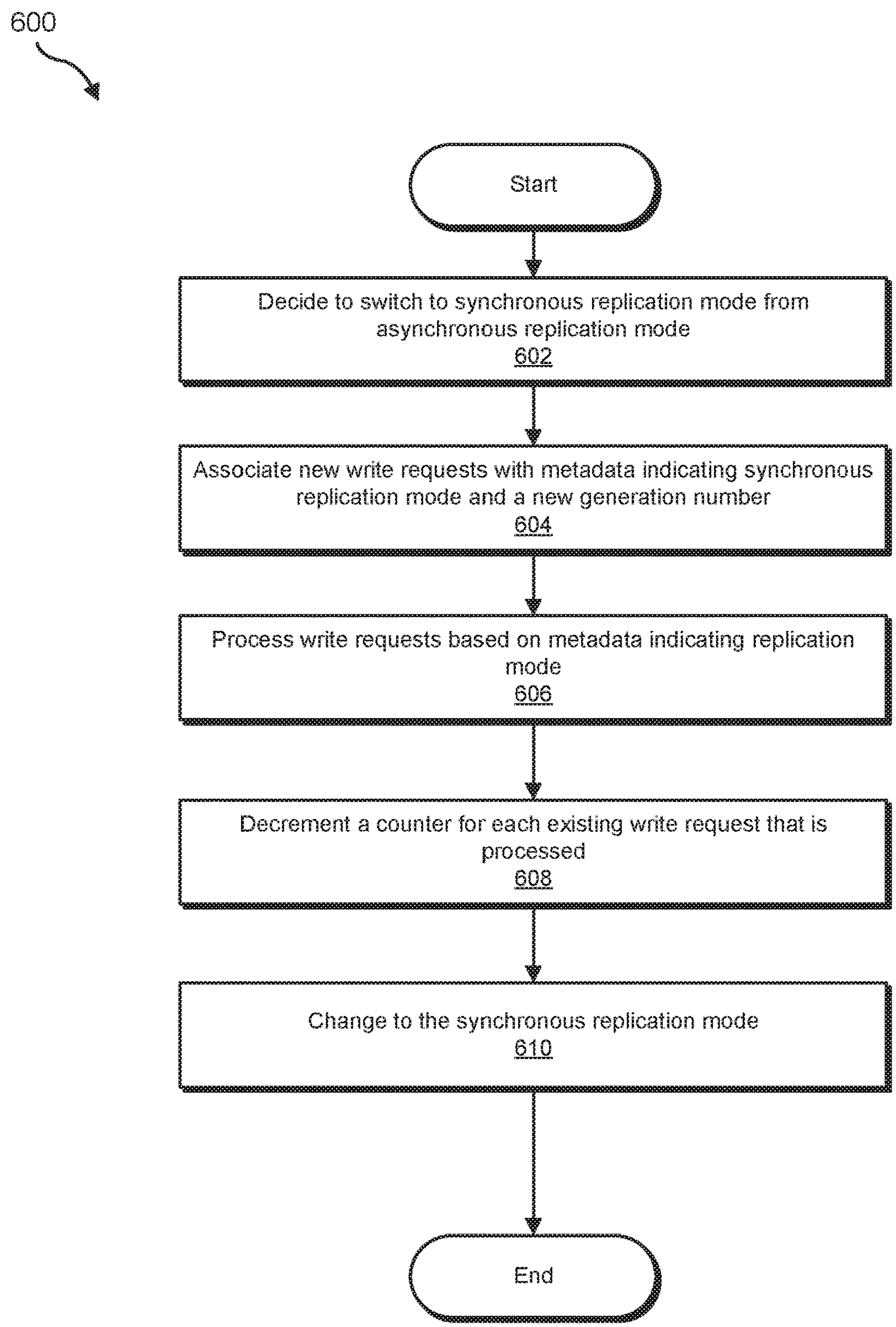
FIG. 6 is a block diagram of another example method for switching replication modes in a volume replication system.

FIG. 6 is a block diagram of another example method 600 for switching replication modes in a volume replication system. The steps shown in FIG. 6 may be performed by any suitable computer-executable code and/or computing system, including the system 100 in FIG. 1, the system 200 in FIG. 2, and/or variations or combinations of one or more of the same. In one example, each of the steps shown in FIG. 6 may represent an algorithm whose structure includes and/or is represented by multiple sub-steps, examples of which will be provided in greater detail below.

As illustrated in FIG. 6, at step 602 one or more of the systems described herein may decide to switch from the asynchronous replication mode to the synchronous replication mode in the volume replication system. The systems described herein may perform step 602 in any suitable manner. For example, the replication mode management module 106 may, as part of computing device 202 in FIG. 2, decide to switch from the asynchronous replication mode to the synchronous replication mode in the volume replication system. In some examples, the replication mode management module 106 may decide to switch replication modes in the volume replication system based on exceeding a different threshold of the computing environment of the computing device 202.

Similar to the discussion of FIG. 5, in some examples, the different threshold may be based on the network latency of the computing environment of the computing device 202. In some examples, the replication mode management module 106 may detect that the network latency has improved by comparing the current network latency to a different threshold. In some examples, the replication mode management module 106 may continuously sample network latency or may receive metrics indicative of the current network latency. If the current network latency exceeds the different threshold, the replication mode management module 106 may decide to change from the asynchronous replication mode to the synchronous replication mode.

In some examples, the threshold may be based on an application performance metric, such as the application load processing time. A decrease in application load processing time may positively impact the throughput of the application. In some examples, the replication mode management module 106 may measure or obtain, a current application load processing time for the application 122. The replication mode management module 106 may compare the current application load processing time to the different threshold to determine whether the current application load processing time has exceeded the different threshold. In response to determining that the application load processing time has exceeded the different threshold, the replication mode management module 106 may decide to change to the synchronous replication mode from the asynchronous mode.

At step 604, one or more of the systems described herein may associate a new write request with metadata indicating synchronous replication and a new generation number. The systems described herein may perform step 604 in any suitable manner. For example, the replication mode management module 106 may associate new write requests with metadata indicating that the write request should be processed via synchronous replication. For example, the replication mode management module 106 may generate or change a flag in the metadata associated with the new write request to indicate that the new write request should be processed via synchronous replication.

The replication mode management module 106 may also associate the new write request with a new generation number. In some examples, while the volume replication system was in asynchronous replication mode, the replication mode management module 106 may have associated write requests with an old generation number indicating that the write request was issued while the system was in the asynchronous replication mode. Upon deciding to switch to the synchronous replication mode, the replication mode management module 106 may have generated a new generation number by incrementing the old generation number. The new and old generation numbers may be used to distinguish existing write requests to be processed using asynchronous replication and new write requests to be processing using synchronous replication. The replication mode management module 106 may associate new write requests using the new generation number. For example, the replication mode management module 106 may indicate that old generation number as X and the new generation number as X+1. In some examples, the sequence numbers assigned to write requests in the SRL 126 may be used as a generation number check. The replication mode management module 106 may record the sequence number of the write request when the replication mode management module 106 decides to change to the synchronous. The replication mode management module 106 may then check sequence numbers of processed write requests against recorded sequence number. This may ensure all write requests of previous generation are processed before changing replication modes.

At step 606, one or more of the systems described herein may process pending write request based on metadata indicating replication mode. The systems described herein may perform step 606 in any suitable manner. For example, the replication mode management module 106 may analyze the metadata associated with the pending write requests and determine whether the write request should be processed via asynchronous replication or synchronous replication. For example, the replication mode management module 106 may identify a flag in the metadata and determine that the pending write request should be processed via asynchronous or synchronous replication. The replication mode management module 106 may initiate processing the pending write request via the specified replication, as described in relation to FIGS. 3 and 4. Upon completion of the pending write request by the system in accordance to the steps outlined in FIG. 3 or 4, the replication mode management module 106 may notify the application 122 that the write request has been completed.

At step 608, one or more of the systems described herein may decrement a counter for each existing write request that is processed. The systems described herein may perform step 606 in any suitable manner. For example, the replication mode management module 106 may create a counter to indicate the number of pending existing write requests that are to be processed via asynchronous replication. As each existing write request is processed via asynchronous replication, the counter may be decremented.

At step 610, one or more of the systems described herein may change to the synchronous replication mode. The systems described herein may perform step 610 in any suitable manner. For example, the replication mode management module 106 may change the replication mode of the volume replication system to the synchronous replication mode. The replication mode management module 106 may initiate the change to the system to reflect the synchronous replication mode, which may include updating information to indicate that new write requests are to be issued in the synchronous mode, processing new write requests will be done in synchronous mode, and the like. In some examples, the RPO of the synchronous replication mode should be zero. In order to ensure that the RPO of the synchronous replication mode is zero the replication mode management module 106 may determine that all secondary storage sites associated with the computing device 202 are synchronized and up-to-date with the primary storage site (e.g., the computing device 202). Thus, in some examples, the replication mode management module 106 may use the generation numbers associated with write requests to determine that all existing write requests have been processed before changing the system to synchronous replication mode. For example, the replication mode management module 106 may check the generation number of all pending write requests to determine if any existing write requests (e.g., issued during the asynchronous replication mode) have been processed. If there are not write requests that are associated with the old generation number, the replication mode management module 106 may change the replication mode of the volume synchronization system to synchronous replication mode. In some examples, in response to the counter in step 608 reaching zero, the replication mode management module 106 may change the replication mode of the volume synchronization system to synchronous replication mode.

Figure 7:
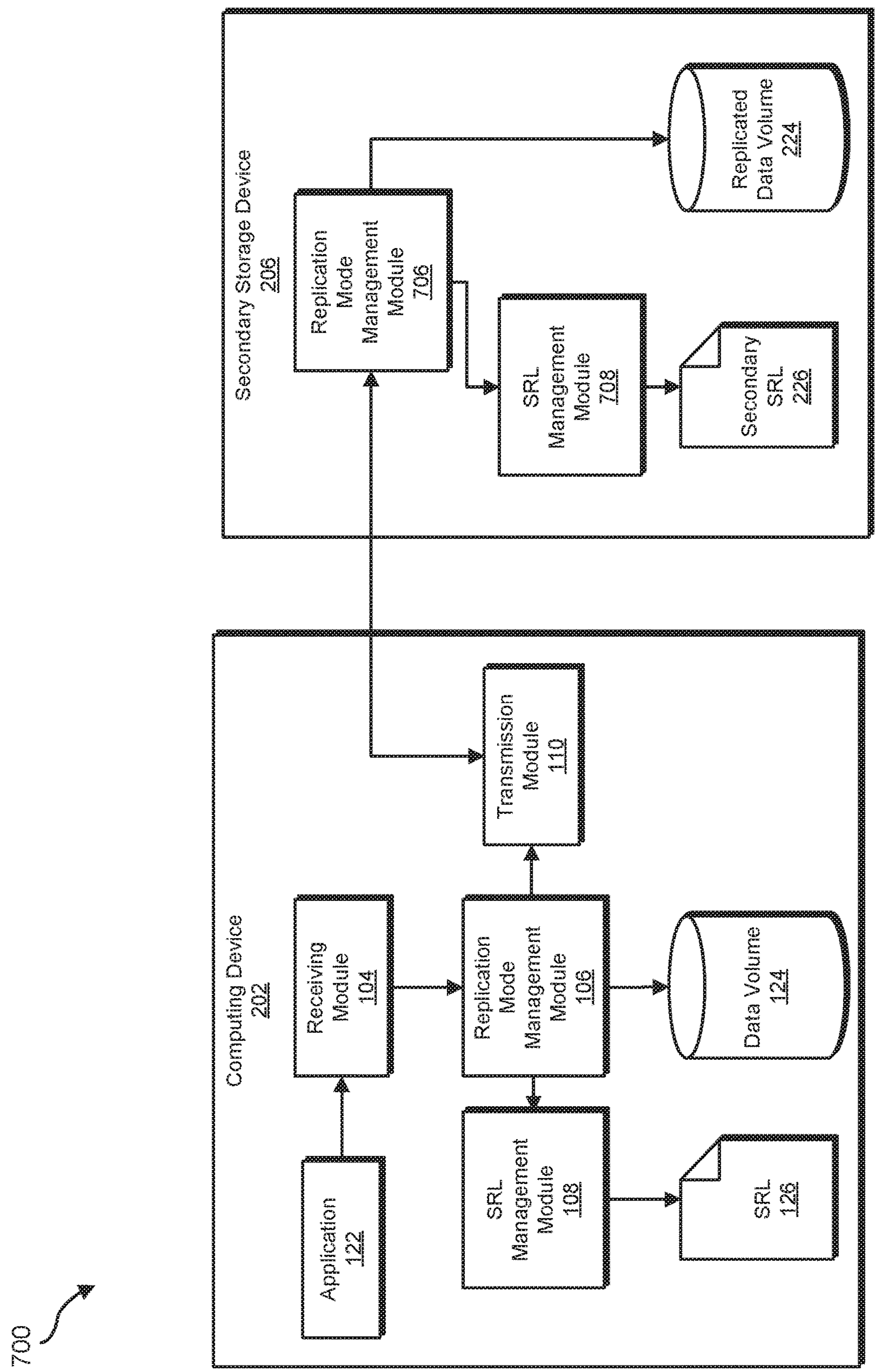
FIG. 7 is a data flow diagram of an example system for switching replication modes in a volume replication system.

FIG. 7 is a data flow diagram of an example system for switching replication modes in a volume replication system. The example system 100 in FIG. 1 may be implemented in a variety of ways. For example, all or a portion of the example system 100 may represent portions of the system 700 in FIG. 7. As will be described in greater detail below, one or more of the modules 102 from FIG. 1 may, when executed by at least one processor of the computing device 202 or the secondary storage device 206, enable the system 700 to switch replication modes for replication data volumes in a volume replication system. For example, and as will be described in greater detail herein, one or more of the modules 102 may cause the example system 700 to receive, by the receiving module 104, a write request from an application 122. The receiving module 104 may transmit the write request to the replication mode management module 106. The replication mode management module 106 may analyze the metadata associated with the write request to determine whether the write request was issued during the asynchronous mode or the synchronous mode. The replication mode management module 106 may cause the SRL management module 108 to log the write request to the SRL 126 of the computing device 202.

In some examples, if the write request was issued during the asynchronous replication mode, the replication mode management module 106 may notify the application 122 that the write request has been complete and may transmit the write request to the transmission module 110 for transmission to the secondary storage device 206 for asynchronous replication of the write request to the secondary storage device 206. The replication mode management module 706 of the secondary storage device 206 may receive the write request, cause the SRL management module 708 to log the write request to the secondary SRL 226 of the secondary storage device 206, and cause the write request to be written to the replicated data volume 224. The replication mode management module 706 may then transmit a data acknowledgement to the transmission module 110 of the computing device, which may notify the replication mode management module 106 of the acknowledgment. The replication mode management module 106 may cause the SRL management module 108 to update the SRL 126 to indicate that the write request has been replicated to the secondary storage device 208 and mark the status as complete.

In some examples, if the write request was issued during the synchronous replication mode, the replication mode management module 106 may transmit the write request to the transmission module 110 for transmission to the secondary storage device 206 for replication of the write request to the secondary storage device 206. The replication mode management module 706 of the secondary storage device 206 may receive the write request, cause the SRL management module 708 to log the write request to the secondary SRL 226 of the secondary storage device 206, and cause the write request to be written to the replicated data volume 224. The replication mode management module 706 may then transmit a data acknowledgement to the transmission module 110 of the computing device, which may notify the replication mode management module 106 of the acknowledgment. The replication mode management module 106 may cause the SRL management module 108 to update the SRL 126 to indicate that the write request has been replicated to the secondary storage device 208 and mark the status as complete. Upon receiving the data acknowledgement from the secondary storage device 206, the replication mode management module 106 may notify the application 122 that issued the write request that the write request has been completed.

The systems and methods described herein are directed to providing sustained application throughput despite fluctuations in a computing environment, such as network latency or application performance metrics. Conventional volume replication systems may need to drain and/or complete pending write requests before switching replication mode in order to update information regarding the current mode of replication in memory as well as on disk. Unfortunately, draining the pending write requests before changing replication modes may cause a lag or glitch to application throughput. Additionally, network latency sensitive applications may crash if draining the pending write requests takes too much time, resulting in possible data loss or other negative results. The systems and methods described herein monitor current conditions of a computing environment to determine whether to change replication modes. In response to deciding to switch replication modes, the system may identify existing pending write request and permit them to be processed using the replication mode in which the request was issued while associating and processing the new write requests with the updated replication mode. The switching of replication modes may enable the system to maintain a desired application throughput despite changing conditions in the computing environment.

Figure 8:
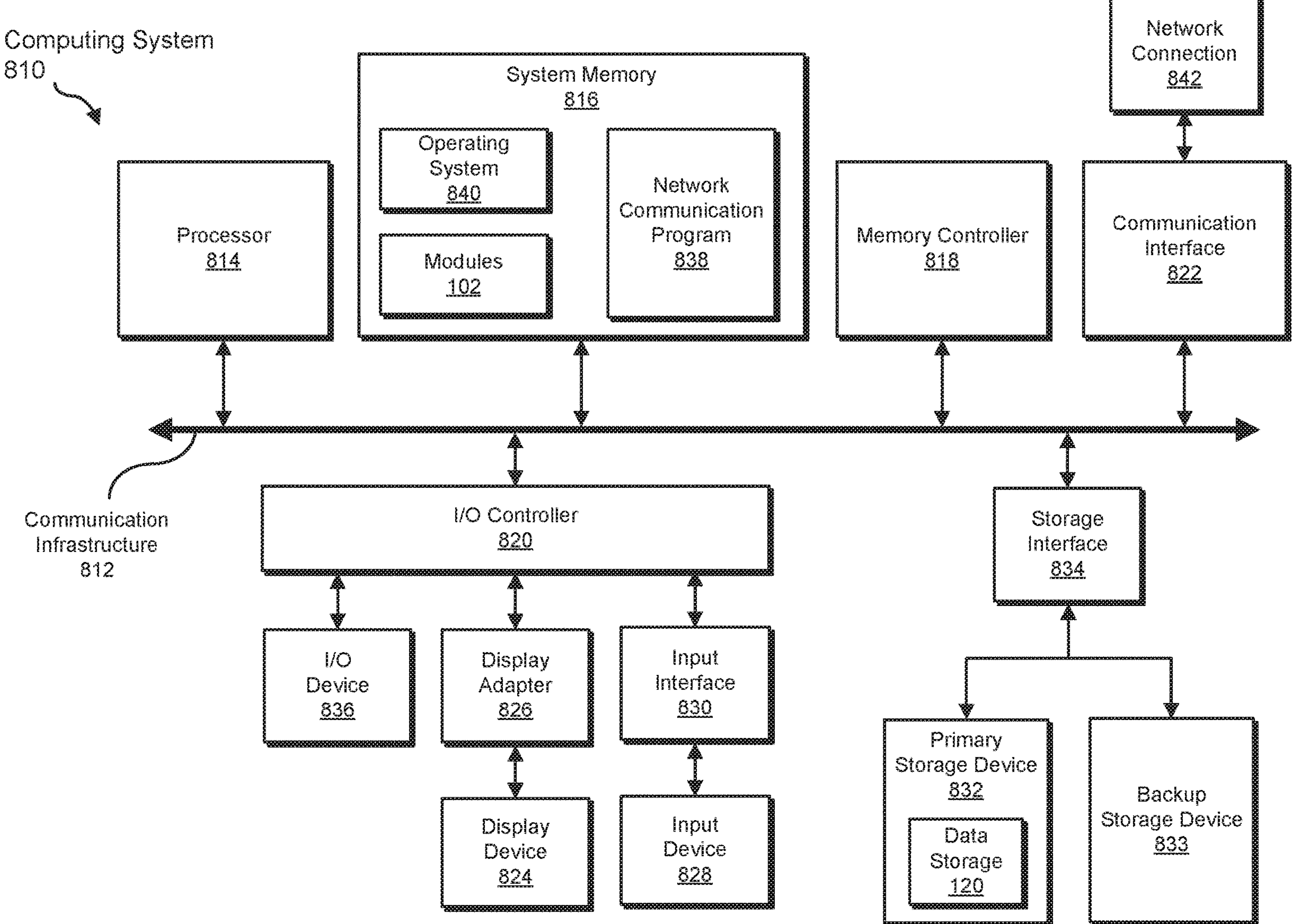
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of the computing system 810 may perform and/or be a means for performing, either alone or in combination with other elements, one or more of the steps described herein (such as one or more of the steps illustrated in FIGS. 3-6). All or a portion of the computing system 810 may also perform and/or be a means for performing any other steps, methods, or processes described and/or illustrated herein.

The computing system 810 broadly represents any single or multi-processor computing device or system capable of executing computer-readable instructions. Examples of the computing system 810 include, without limitation, workstations, laptops, client-side terminals, servers, distributed computing systems, handheld devices, or any other computing system or device. In its most basic configuration, the computing system 810 may include at least one processor 814 and a system memory 816.

The processor 814 generally represents any type or form of physical processing unit (e.g., a hardware-implemented central processing unit) capable of processing data or interpreting and executing instructions. In certain embodiments, the processor 814 may receive instructions from a software application or module. These instructions may cause the processor 814 to perform the functions of one or more of the example embodiments described and/or illustrated herein.

The system memory 816 generally represents any type or form of volatile or non-volatile storage device or medium capable of storing data and/or other computer-readable instructions. Examples of the system memory 816 include, without limitation, Random Access Memory (RAM), Read Only Memory (ROM), flash memory, or any other suitable memory device. Although not required, in certain embodiments the computing system 810 may include both a volatile memory unit (such as, for example, the system memory 816) and a non-volatile storage device (such as, for example, the primary storage device 832, as described in detail below). In one example, one or more of the modules 102 from FIG. 1 may be loaded into the system memory 816.

In some examples, the system memory 816 may store and/or load an operating system 840 for execution by the processor 814. In one example, the operating system 840 may include and/or represent software that manages computer hardware and software resources and/or provides common services to computer programs and/or applications on the computing system 810. Examples of the operating system 840 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, the example computing system 810 may also include one or more components or elements in addition to the processor 814 and the system memory 816. For example, as illustrated in FIG. 8, the computing system 810 may include a memory controller 818, an Input/Output (I/O) controller 820, and a communication interface 822, each of which may be interconnected via a communication infrastructure 812. The communication infrastructure 812 generally represents any type or form of infrastructure capable of facilitating communication between one or more components of a computing device. Examples of the communication infrastructure 812 include, without limitation, a communication bus (such as an Industry Standard Architecture (ISA), Peripheral Component Interconnect (PCI), PCI Express (PCIe), or similar bus) and a network.

The memory controller 818 generally represents any type or form of device capable of handling memory or data or controlling communication between one or more components of the computing system 810. For example, in certain embodiments, the memory controller 818 may control communication between the processor 814, the system memory 816, and the I/O controller 820 via the communication infrastructure 812.

The I/O controller 820 generally represents any type or form of module capable of coordinating and/or controlling the input and output functions of a computing device. For example, in certain embodiments, the I/O controller 820 may control or facilitate transfer of data between one or more elements of the computing system 810, such as the processor 814, the system memory 816, the communication interface 822, the display adapter 826, the input interface 830, and the storage interface 834.

As illustrated in FIG. 8, the computing system 810 may also include at least one display device 824 coupled to the I/O controller 820 via a display adapter 826. The display device 824 generally represents any type or form of device capable of visually displaying information forwarded by the display adapter 826. Similarly, the display adapter 826 generally represents any type or form of device configured to forward graphics, text, and other data from the communication infrastructure 812 (or from a frame buffer, as known in the art) for display on the display device 824.

As illustrated in FIG. 8, the example computing system 810 may also include at least one input device 828 coupled to I/O controller 820 via an input interface 830. Input device 828 generally represents any type or form of input device capable of providing input, either computer or human generated, to the example computing system 810. Examples of the input device 828 include, without limitation, a keyboard, a pointing device, a speech recognition device, variations or combinations of one or more of the same, and/or any other input device.

Additionally, or alternatively, the example computing system 810 may include additional I/O devices. For example, the example computing system 810 may include the I/O device 836. In this example, the I/O device 836 may include and/or represent a user interface that facilitates human interaction with the computing system 810. Examples of the I/O device 836 include, without limitation, a computer mouse, a keyboard, a monitor, a printer, a modem, a camera, a scanner, a microphone, a touchscreen device, variations or combinations of one or more of the same, and/or any other I/O device.

The communication interface 822 broadly represents any type or form of communication device or adapter capable of facilitating communication between the example computing system 810 and one or more additional devices. For example, in certain embodiments, the communication interface 822 may facilitate communication between the computing system 810 and a private or public network including additional computing systems. Examples of the communication interface 822 include, without limitation, a wired network interface (such as a network interface card), a wireless network interface (such as a wireless network interface card), a modem, and any other suitable interface. In at least one example, the communication interface 822 may provide a direct connection to a remote storage device via a direct link to a network, such as the Internet. The communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, the communication interface 822 may also represent a host adapter configured to facilitate communication between the computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. The communication interface 822 may also allow the computing system 810 to engage in distributed or remote computing. For example, the communication interface 822 may receive instructions from a remote device or send instructions to a remote device for execution.

In some examples, the system memory 816 may store and/or load a network communication program 838 for execution by the processor 814. In one example, the network communication program 838 may include and/or represent software that enables the computing system 810 to establish a network connection 842 with another computing system (not illustrated in FIG. 8) and/or communicate with the other computing system by way of the communication interface 822. In this example, the network communication program 838 may direct the flow of outgoing traffic that is sent to the other computing system via the network connection 842. Additionally, or alternatively, the network communication program 838 may direct the processing of incoming traffic that is received from the other computing system via the network connection 842 in connection with the processor 814.

Although not illustrated in this way in FIG. 8, the network communication program 838 may alternatively be stored and/or loaded in the communication interface 822. For example, the network communication program 838 may include and/or represent at least a portion of software and/or firmware that is executed by a processor and/or Application Specific Integrated Circuit (ASIC) incorporated in the communication interface 822.

As illustrated in FIG. 8, the example computing system 810 may also include a primary storage device 832 and a backup storage device 833 coupled to the communication infrastructure 812 via a storage interface 834. The storage devices 832 and 833 generally represent any type or form of storage device or medium capable of storing data and/or other computer-readable instructions. For example, the storage devices 832 and 833 may be a magnetic disk drive (e.g., a so-called hard drive), a solid state drive, a floppy disk drive, a magnetic tape drive, an optical disk drive, a flash drive, or the like. The storage interface 834 generally represents any type or form of interface or device for transferring data between the storage devices 832 and 833 and other components of the computing system 810. In one example, the application 122, data volume 124, and the SRL 126 from FIG. 1 may be stored and/or loaded in the primary storage device 832.

In certain embodiments, the storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 832 and 833 may also include other similar structures or devices for allowing computer software, data, or other computer-readable instructions to be loaded into the computing system 810. For example, the storage devices 832 and 833 may be configured to read and write software, data, or other computer-readable information. The storage devices 832 and 833 may also be a part of the computing system 810 or may be a separate device accessed through other interface systems.

Many other devices or subsystems may be connected to the computing system 810. Conversely, all of the components and devices illustrated in FIG. 8 need not be present to practice the embodiments described and/or illustrated herein. The devices and subsystems referenced above may also be interconnected in different ways from that shown in FIG. 8. The computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into the computing system 810. All or a portion of the computer program stored on the computer-readable medium may then be stored in the system memory 816 and/or various portions of the storage devices 832 and 833. When executed by the processor 814, a computer program loaded into the computing system 810 may cause the processor 814 to perform and/or be a means for performing the functions of one or more of the example embodiments described and/or illustrated herein. Additionally, or alternatively, one or more of the example embodiments described and/or illustrated herein may be implemented in firmware and/or hardware. For example, the computing system 810 may be configured as an Application Specific Integrated Circuit (ASIC) adapted to implement one or more of the example embodiments disclosed herein.

Figure 9:
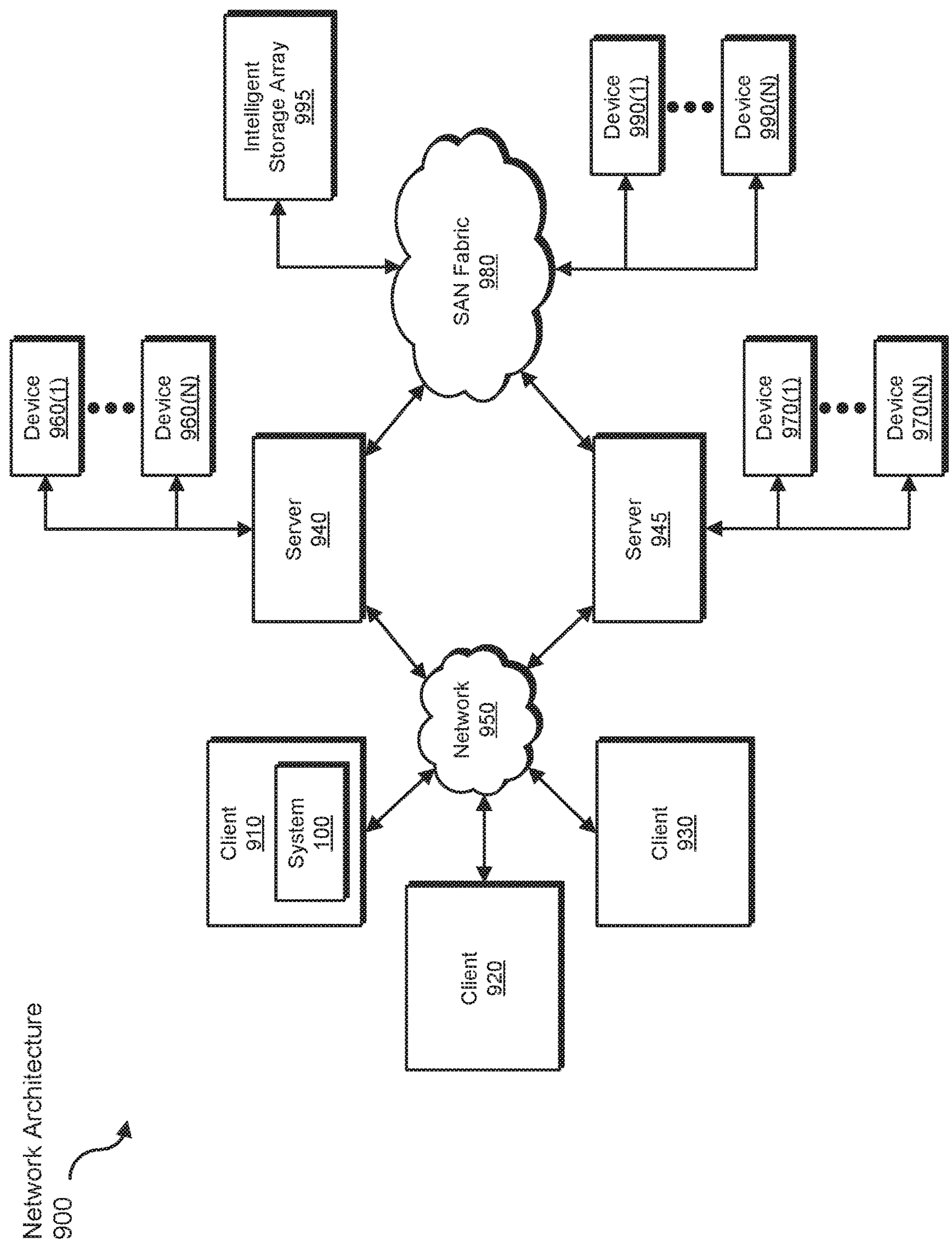
FIG. 9 is a block diagram of an example computing network capable of implementing one or more of the embodiments described and/or illustrated herein.

FIG. 9 is a block diagram of an example network architecture 900 in which the client systems 910, 920, and 930 and the servers 940 and 945 may be coupled to a network 950. As detailed above, all or a portion of the network architecture 900 may perform and/or be a means for performing, either alone or in combination with other elements, one or more of the steps disclosed herein (such as one or more of the steps illustrated in FIGS. 3-6). All or a portion of the network architecture 900 may also be used to perform and/or be a means for performing other steps and features set forth in the instant disclosure.

The client systems 910, 920, and 930 generally represent any type or form of computing device or system, such as the example computing system 810 in FIG. 8. Similarly, the servers 940 and 945 generally represent computing devices or systems, such as application servers or database servers, configured to provide various database services and/or run certain software applications. The network 950 generally represents any telecommunication or computer network including, for example, an intranet, a WAN, a LAN, a PAN, or the Internet. In one example, the client systems 910, 920, and/or 930 and/or the servers 940 and/or 945 may include all or a portion of the system 100 from FIG. 1.

As illustrated in FIG. 9, the one or more storage devices 960(1)-(N) may be directly attached to the server 940. Similarly, the one or more storage devices 970(1)-(N) may be directly attached to the server 945. The storage devices 960(1)-(N) and the storage devices 970(1)-(N) generally represent any type or form of storage device or medium capable of storing data and/or other computer-readable instructions. In certain embodiments, the storage devices 960(1)-(N) and the storage devices 970(1)-(N) may represent Network-Attached Storage (NAS) devices configured to communicate with the servers 940 and 945 using various protocols, such as Network File System (NFS), Server Message Block (SMB), or Common Internet File System (CIFS).

The servers 940 and 945 may also be connected to a Storage Area Network (SAN) fabric 980. The SAN fabric 980 generally represents any type or form of computer network or architecture capable of facilitating communication between a plurality of the storage devices. The SAN fabric 980 may facilitate communication between the servers 940 and 945 and a plurality of the storage devices 990(1)-(N) and/or an intelligent storage array 995. The SAN fabric 980 may also facilitate, via the network 950 and the servers 940 and 945, communication between the client systems 910, 920, and 930 and the storage devices 990(1)-(N) and/or the intelligent storage array 995 in such a manner that the devices 990(1)-(N) and the array 995 appear as locally attached devices to the client systems 910, 920, and 930. As with the storage devices 960(1)-(N) and the storage devices 970(1)-(N), the storage devices 990(1)-(N) and the intelligent storage array 995 generally represent any type or form of storage device or medium capable of storing data and/or other computer-readable instructions.

In certain embodiments, and with reference to the example computing system 810 of FIG. 8, a communication interface, such as the communication interface 822 in FIG. 8, may be used to provide connectivity between each client system 910, 920, and 930 and the network 950. The client systems 910, 920, and 930 may be able to access information on the server 940 or 945 using, for example, a web browser or other client software. Such software may allow the client systems 910, 920, and 930 to access data hosted by the server 940, the server 945, the storage devices 960(1)-(N), the storage devices 970(1)-(N), the storage devices 990(1)-(N), or the intelligent storage array 995. Although FIG. 9 depicts the use of a network (such as the Internet) for exchanging data, the embodiments described and/or illustrated herein are not limited to the Internet or any particular network-based environment.

In at least one example, all or a portion of one or more of the example embodiments disclosed herein may be encoded as a computer program and loaded onto and executed by the server 940, the server 945, the storage devices 960(1)-(N), the storage devices 970(1)-(N), the storage devices 990(1)-(N), the intelligent storage array 995, or any combination thereof. All or a portion of one or more of the example embodiments disclosed herein may also be encoded as a computer program, stored in the server 940, run by the server 945, and distributed to the client systems 910, 920, and 930 over the network 950.

As detailed above, the computing system 810 and/or one or more components of the network architecture 900 may perform and/or be a means for performing, either alone or in combination with other elements, one or more steps of an example method for switching replication modes in a volume replication system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of the example system 100 in FIG. 1 may represent portions of a cloud-computing or network-based environment. The cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of the example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the example system 100 in FIG. 1 may represent portions of a mobile computing environment. The mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for switching replication modes in a volume replication system, at least a portion of the method being performed by a computing device comprising at least one processor, the method comprising:

in response to deciding to switch from a synchronous replication mode of a volume replication system to an asynchronous replication mode, changing, by a computing device, to the asynchronous replication mode;

associating a new write request to write data to storage with metadata indicating that the new write request was issued while the volume replication system was in the asynchronous replication mode;

determining, based on metadata of an existing write request, that the existing write request was issued while the volume replication system was in the synchronous replication mode;

in response to determining that the existing write request was issued in the synchronous replication mode, processing the existing write request via synchronous replication; and processing the new write request via asynchronous replication based on the metadata of the new write request.

2. The computer-implemented method of claim 1, wherein processing the existing write request via the synchronous replication comprises:

receiving the existing write request from an application of the computing device;

logging the existing write request to a storage replicator log of the computing device;

processing the existing write request by writing data to a data volume of the computing device;

transmitting the existing write request to a secondary storage device;

logging the existing write request to a secondary storage replicator log of the secondary storage device;

processing the existing write request by writing data to a secondary data volume of the secondary storage device; and in response to processing the existing write request at the secondary storage device, notifying the application that the existing write request is complete.

3. The computer-implemented method of claim 1, wherein processing the new write request via the asynchronous replication comprises:

receiving the new write request from an application of the computing device;

logging the new write request to a storage replicator log of the computing device;

processing the new write request by writing data to a data volume of the computing device;

in response to processing the new write request at the computing device, notifying the application that the new write request is complete;

transmitting the new write request to a secondary storage device at a later point in time;

logging the new write request to a secondary storage replicator log of the secondary storage device; and processing the new write request to write data to a secondary data volume of the secondary storage device.

4. The computer-implemented method of claim 1, further comprising:

in response to deciding to switch from the asynchronous replication mode to the synchronous replication mode, associating a different new write request with metadata indicating that the different new write request was issued while in the synchronous replication mode and associate the different new write request with a new generation number;

processing a different existing write request via the asynchronous replication based on metadata indicating that the different existing write request was issued while in the asynchronous replication mode and an old generation number of the different existing write request indicating the different existing write request was generated while in the asynchronous replication mode;

processing the different new write request via the synchronous replication based on the metadata of the different new write request and the new generation number of the different new write request; and in response to determining that each existing write request has been processed, changing to the synchronous replication mode.

5. The computer-implemented method of claim 4, further comprising:

in response to deciding to switch from the asynchronous replication mode to the synchronous replication mode, generating the new generation number by incrementing the old generation number to indicate a switch in replication modes;

generating a counter indicative of a total number of different existing write requests generated while in the asynchronous replication mode;

decrementing the counter for each different existing write request that has been processed; and in response to the counter reaching a predetermined value indicating that each of the different existing write requests has been processed, changing to the synchronous replication mode.

6. The computer-implemented method of claim 1, further comprising:

deciding to switch from the synchronous replication mode of the volume replication system to the asynchronous replication mode based on a threshold of a computing environment of the computing device by:

determining that the threshold has been exceeded; and in response to determining that the threshold has been exceeded, deciding to change to the asynchronous replication mode.

7. The computer-implemented method of claim 6, wherein the threshold is based on at least one of a network latency, an application load processing time, an application throughput limit, an input/output operations per second limit, an application workload pattern, or a window of time.

8. A system for switching replication modes in a volume replication system, the system comprising:

a computing device comprising at least one physical processor; and physical memory comprising computer-executable instructions that, when executed by the at least one physical processor, cause the computing device to:

in response to a deciding to switch from a synchronous replication mode of a volume replication system to an asynchronous replication mode, change to the asynchronous replication mode;

associate a new write request to write data to storage with metadata indicating that the new write request was issued while the volume replication system was in the asynchronous replication mode;

determine, based on metadata of an existing write request, that the existing write request was issued while the volume replication system was in the synchronous replication mode;

in response to determining that the existing write request was issued in the synchronous replication mode, process the existing write request via the synchronous replication; and process the new write request via the asynchronous replication based on the metadata of the new write request.

9. The system of claim 8, wherein, to process the existing write request via the synchronous replication, the computer-executable instructions further cause the computing device to:

receive the existing write request from an application of the computing device;

log the existing write request to a storage replicator log of the computing device;

process the existing write request by writing data to a data volume of the computing device;

transmit the existing write request to a secondary storage device;

log the existing write request to a secondary storage replicator log of the secondary storage device;

process the existing write request by writing data to a secondary data volume of the secondary storage device; and in response to processing the existing write request at the secondary storage device, notify the application that the existing write request is complete.

10. The system of claim 8, wherein, to process the new write request via the asynchronous replication, the computer-executable instructions further cause the computing device to:

receive the new write request from an application of the computing device;

log the new write request to a storage replicator log of the computing device;

process the new write request by writing data to a data volume of the computing device;

in response to processing the new write request at the computing device, notify the application that the new write request is complete;

transmit the new write request to a secondary storage device at a later point in time;

log the new write request to a secondary storage replicator log of the secondary storage device; and process the new write request to write data to a secondary data volume of the secondary storage device.

11. The system of claim 8, wherein the computer-executable instructions further cause the computing device to:

in response to deciding to switch from the asynchronous replication mode to the synchronous replication mode, associate a different new write request with metadata indicating that the different new write request was issued while in the synchronous replication mode and associate the different new write request with a new generation number;

process a different existing write request via the asynchronous replication based on metadata indicating that the different existing write request was issued while in the asynchronous replication mode and an old generation number of the different existing write request indicating the different existing write request was generated while in the asynchronous replication mode;

process the different new write request via the synchronous replication based on the metadata of the different new write request and the new generation number of the different new write request; and in response to determining that each existing write request has been processed, changing to the synchronous replication mode.

12. The system of claim 11, wherein the computer-executable instructions further cause the computing device to:

in response to deciding to switch from the asynchronous replication mode to the synchronous replication mode, generate the new generation number by incrementing the old generation number to indicate a switch in replication modes;

generate a counter indicative of a total number of different existing write requests generated while in the asynchronous replication mode;

decrement the counter for each different existing write request that has been processed; and in response to the counter reaching a predetermined value indicating that each of the different existing write requests has been processed, change to the synchronous replication mode.

13. The system of claim 8, wherein the computer-executable instructions further cause the computing device to:

deciding to switch from the synchronous replication mode of the volume replication system to the asynchronous replication mode based on a threshold of a computing environment of the computing device by:

determining that the threshold has been exceeded; and in response to determining that the threshold has been exceeded, deciding to change to the asynchronous replication mode.

14. The system of claim 13, wherein the threshold is based on at least one of a network latency, an application load processing time, an application throughput limit, an input/output per second limit, an application workload pattern, or a window of time.

15. A non-transitory computer-readable medium comprising one or more computer-executable instructions that, when executed by at least one processor of a computing device, cause the computing device to:

in response to a deciding to switch from a synchronous replication mode of a volume replication system to an asynchronous replication mode, change to the asynchronous replication mode;

associate a new write request to write data to storage with metadata indicating that the new write request was issued while the volume replication system was in the asynchronous replication mode;

determine, based on metadata of an existing write request, that the existing write request was issued while the volume replication system was in the synchronous replication mode;

in response to determining that the existing write request was issued in the synchronous replication mode, process the existing write request via the synchronous replication; and process the new write request via the asynchronous replication based on the metadata of the new write request.

16. The non-transitory computer-readable medium of claim 15, wherein, to process the existing write request via the synchronous replication, the computer-executable instructions further cause the computing device to:

receive the existing write request from an application of the computing device;

log the existing write request to a storage replicator log of the computing device;

process the existing write request by writing data to a data volume of the computing device;

transmit the existing write request to a secondary storage device;

log the existing write request to a secondary storage replicator log of the secondary storage device;

process the existing write request by writing data to a secondary data volume of the secondary storage device; and in response to processing the existing write request at the secondary storage device, notify the application that the existing write request is complete.

17. The non-transitory computer-readable medium of claim 15, wherein, to process the new write request via the asynchronous replication, the computer-executable instructions further cause the computing device to:

receive the new write request from an application of the computing device;

log the new write request to a storage replicator log of the computing device;

process the new write request by writing data to a data volume of the computing device;

in response to processing the new write request at the computing device, notify the application that the new write request is complete;

transmit the new write request to a secondary storage device at a later point in time;

log the new write request to a secondary storage replicator log of the secondary storage device; and process the new write request to write data to a secondary data volume of the secondary storage device.

18. The non-transitory computer-readable medium of claim 15, wherein the computer-executable instructions further cause the computing device to:

in response to deciding to switch from the asynchronous replication mode to the synchronous replication mode, associate a different new write request with metadata indicating that the different new write request was issued while in the synchronous replication mode and associate the different new write request with a new generation number;

process a different existing write request via the asynchronous replication based on metadata indicating that the different existing write request was issued while in the asynchronous replication mode and an old generation number of the different existing write request indicating the different existing write request was generated while in the asynchronous replication mode;

process the different new write request via the synchronous replication based on the metadata of the different new write request and the new generation number of the different new write request; and in response to determining that each existing write request has been processed, changing to the synchronous replication mode.

19. The non-transitory computer-readable medium of claim 18, wherein the computer-executable instructions further cause the computing device to:

in response to deciding to switch from the asynchronous replication mode to the synchronous replication mode, generate the new generation number by incrementing the old generation number to indicate a switch in replication modes;

generate a counter indicative of a total number of different existing write requests generated while in the asynchronous replication mode;

decrement the counter for each different existing write request that has been processed; and in response to the counter reaching a predetermined value indicating that each of the different existing write requests has been processed, change to the synchronous replication mode.

20. The non-transitory computer-readable medium of claim 15, wherein the computer-executable instructions further cause the computing device to:

decide to switch from the synchronous replication mode of the volume replication system to the asynchronous replication mode based on a threshold of a computing environment of the computing device by:

determining that the threshold has been exceeded; and in response to determining that the threshold has been exceeded, deciding to change to the asynchronous replication mode.

* * * * *